United States Patent

Gadkaree et al.

[11] Patent Number: 5,776,385
[45] Date of Patent: Jul. 7, 1998

[54] METHOD OF MAKING ACTIVATED CARBON COMPOSITES FROM SUPPORTED CROSSLINKABLE RESINS

[75] Inventors: Kishor P. Gadkaree, Big Flats; Joseph F. Mach, Lindley, both of N.Y.

[73] Assignee: Corning Incorporated, Corning, N.Y.

[21] Appl. No.: 806,892

[22] Filed: Feb. 25, 1997

Related U.S. Application Data

[63] Continuation of Ser. No. 434,221, May 4, 1995, abandoned, which is a continuation of Ser. No. 228,265, Apr. 15, 1994, abandoned.

[51] Int. Cl.[6] .................................................. C01B 31/00
[52] U.S. Cl. .................. 264/29.5; 264/29.6; 264/29.7; 264/44; 156/292; 55/388; 55/524
[58] Field of Search .................................. 156/197, 292, 156/296; 55/388, 524; 264/29, 44, 59; 525/438, 421, 445, 444

[56] References Cited

U.S. PATENT DOCUMENTS

| | | |
|---|---|---|
| 3,825,460 | 7/1974 | Yoshikawa et al. . |
| 3,922,412 | 11/1975 | Yoshikawa et al. . |
| 4,118,341 | 10/1978 | Ishibashi et al. . |
| 4,772,508 | 9/1988 | Brassell . |
| 4,923,843 | 5/1990 | Saforo et al. . |
| 4,992,319 | 2/1991 | Kurosawa et al. . |
| 5,225,081 | 7/1993 | Brownawell . |

FOREIGN PATENT DOCUMENTS

| | | |
|---|---|---|
| 3123547 | 10/1978 | Japan . |
| 6049326 | 7/1992 | Japan . |
| 6049327 | 7/1992 | Japan . |

*Primary Examiner*—Merrick Dixon
*Attorney, Agent, or Firm*—L. Rita Quatrini

[57] ABSTRACT

A method for making an activated carbon composite which involves providing a crosslinkable resin and a support material which is wettable by the resin. The support material can be cotton, chopped wood, sisal, non-fugitive material, and combinations of these. The support is contacted with the resin; and the resin and support material are dried. The resin and support material are then shaped, the resin is cured, and the resin and any carbonizable material are carbonized. The carbon is then activated to produce the product composite. An activated carbon composite produced by the above described method in which the carbon is in the form of a continuous structure reinforced by and uniformly distributed throughout non-fugitive support material.

18 Claims, No Drawings

METHOD OF MAKING ACTIVATED CARBON COMPOSITES FROM SUPPORTED CROSSLINKABLE RESINS

This is a continuation of application Ser. No. 08/434,221 filed May 4, 1995, now abandoned which is a continuation of application Ser. No. 08/228,265, filed Apr. 15, 1994.

This invention relates to high adsorption capacity activated carbon composites which are made by impregnating support material with a crosslinkable resin, followed by curing the resin, shaping, carbonizing, and activating. These composites have high adsorption capacity per unit volume and are strong and are not subject to attrition as are conventional granulated carbon beds.

BACKGROUND OF THE INVENTION

Beds packed with granulated activated carbons have traditionally been used in many liquid and gas purification applications. One example of use of a packed granulated activated carbon beds is in the automotive industry in which the bed is mounted on top of the gasoline tank to trap gasoline vapors. Another automotive application is in vehicles which use adsorbed natural gas as fuel. The natural gas is adsorbed on activated carbon and is released and combusted to power the vehicle when needed.

In all these automotive applications it is very important that the adsorption capacity per unit volume be maximized so that the canisters do not become prohibitively bulky. As emission requirements become more stringent, higher adsorption capacity is needed, which can only be obtained by increasing the canister volume.

In general, high adsorption capacity is desirable even when volume reduction of the bed is not necessary. In such cases, the time between regenerations can be increased significantly depending on the increase in capacity and hence lower operating costs. Some of the other problems associated with the granulated packed beds are as follows. In applications where the bed is vibrated during use such as in an automobile, attrition of granules results in formation of fine particles which can trapped in the moving fluid. The flow paths in granulated beds are random and will change with time due to the formation of fines. This may result in decrease in adsorption efficiency. The is pressure drops across granulated beds are high for flowing systems which results in high energy costs for pumping, etc.

It would be highly desirable to have activated carbon in a form in which it would have high adsorption capacity per unit volume, the attrition problem is eliminated, pressure drop is minimized and at the same time surface area of contact is maximized in a given volume to obtain high adsorption efficiency.

The present invention provides such a carbon body and a method of making it.

SUMMARY OF THE INVENTION

In accordance with one aspect of the invention, there is provided a method for making an activated carbon composite which involves providing a crosslinkable resin and a support material which is wettable by the resin. The support material can be cotton, chopped wood, sisal, non-fugitive material, and combinations of these. The support is contacted with the resin; and the resin and support material are dried. The resin and support material are then shaped, the resin is cured, and the resin and any carbonizable material are carbonized. The carbon is then activated to produce the product composite.

In accordance with another aspect of the invention, there is provided an activated carbon composite produced by the above described method in which the carbon is in the form of a continuous structure reinforced by and uniformly distributed throughout non-fugitive support material.

DETAILED DESCRIPTION OF THE INVENTION

The present invention relates to an activated carbon composite. The composite can be in the form of a unitary body, or granules. A unitary body is characterized preferably by flow through channels which are straight or curved essentially parallel channels for optimum flowability of a fluid work stream therethrough. Honeycomb shapes are especially preferred because they offer large flow through area.

The carbon atoms within the composite are arranged in a continuous uninterrupted structure of random three dimensional graphitic platelets. The platelets have angstrom sized pores typically about 5 to about 50 angstroms for adsorption as distinguished from micron-size pores. Pores in several hundred micron size range can be present in the body, but they do not contribute to adsorption capacity. The continuous carbon structure can be distinguished from "discontinuous" discrete carbon particles which must be bound to each other and to a substrate with a binder. In such cases, the binder particles are interspersed throughout the carbon particles thus rendering the carbon discontinuous.

In a preferred embodiment of the present invention, the carbon is supported on and is uniformly distributed throughout a non-fugitive support material which serves to reinforce the body. Preferably the weight ratio of carbon to non-fugitive support material ranges from about 19:1 to about 1:19, preferably greater than about 1, with about 3:1 to about 9:1 being especially preferred for a good combination of reinforcement and adsorption capacity.

The bodies are continuous, hard, and strong carbon bodies of high durability. Since there are no discrete discontinuous carbon particles, the problems of attrition associated with conventional granulated beds are eliminated and pressure drop through the body is minimized in the application. Also, since the bodies of the present invention do not have binders and therefore, the adsorption capacity per unit volume is very high.

The bodies of the present invention are suited for use in any of a wide variety of applications for which activated carbon bodies have been used in the past. Examples of such applications include residential water purification, volatile organic compound emission control, natural gas fuel storage for gas-powered vehicles or equipment, indoor air purification, industrial respirators, automotive cabin air filters, ventless hoods, chemical separations, $NO_x$ and $SO_x$ control, and exhaust traps for automotive cold start applications. Other potential applications include use as ozone filters, mercury collection from municipal incinerators, radon adsorption, automotive gas tank or intake manifold emissions, sewer pump vents, oil-air separations, or any other application wherein adsorption of a component or components from a fluid stream containing multiple components is desired.

The method for making the bodies involves contacting support material with a crosslinkable resin to wet, in other words, to impregnate or saturate the material with the resin. The resin-saturated support material is then dried and shaped, and the resin is then cured and carbonized. The carbon is then activated.

The Resin

A critical characteristic of the resin is that it be crosslinkable. These resins form three-dimensional network structures extending throughout the final body. The final body is stable to heat and cannot be made to melt or flow. Examples of resins that can be considered suitable to the practice of the present invention are the thermosetting resins such as phenolics, furan, epoxies, and thermoplastic polymers such as polyacrylonitrile, polyvinyl chloride, etc., which although not thermosetting, can be crosslinked by high temperature oxidation. It is desirable that the resin give a high carbon yield on carbonization, that is, for example at least about 25%, and preferably at least about 40% based on the amount of cured resin. Thermosetting resins normally give these high yields. Thermosetting resins are the preferred resins. Examples of thermosetting resins that can be used in the practice of the present invention are phenolics, furan, epoxies, and combinations of these. Preferred resins are phenolics, furan, and combinations of these because of their high carbon yield and low viscosities at room temperature. Normally, the viscosities can vary from about 50 cps to about 1000 cps. The preferred viscosities are about 100 to about 500 cps. The resins can be provided as solids, liquids, solutions, or suspensions.

One resin that is especially suited to the practice of the present invention is phenolic resole. The phenolic resoles are solutions of phenolics in water. A higher viscosity suspension of solid phenolic powder in liquid resin can be used to increase the amount of resin in the support material and thus the final carbon yield. One, especially suited resin is a phenolic resole resin available from Occidental Chemical Corporation, Niagara Falls, N.Y. under the product name of Plyophen 43290. According to OxyChem® Material Safety Data Sheet No. M26359, Plyophen 43290 is a liquid one step phenolic resin containing phenol, formaldehyde, and water, having a specific gravity of 1.22–1.24, boiling point >100° C. and a pH of 7.5–7.7 @ 100 gm/l.

Furan resins are available as liquids. One furan that is suitable to the practice of the present invention is supplied by QO Chemicals, Inc. under the name of Furcarb® LP. According to the Material Safety Data Sheet by QO Chemicals, Inc., Furcarb® LP resins preparations of phenol (4% max) in furfuryl alcohol, and have a specific gravity of 1.2, and a boiling point of 170° C. The viscosity is 300 cps.

The Support Material

The support material must be capable of being wetted and thoroughly impregnated by a solution or suspension of the chosen resin in order to result in the highs amount of carbon in the body for high adsorption capacity described previously.

For optimum wettability and impregnability, the support material is best provided in the form of loose material such as powders or fibers, with fibers being the preferred form for facility in shaping. The support material can be made, eg. woven into preshapes of high void volume. The support material is therefore distinguishable from continuous or dense inorganic bodies such as cordierite substrates on which only a limited amount of carbon can be coated or supported even if they such bodies porous. For example, the weight ratio of carbon to substrate in such bodies is not greater than about 1.

Some materials that can be used as support materials according to the practice of the present invention are cotton, chopped wood, eg., sawdust or wood fibers, sisal fibers, all of which are fugitive, or non-fugitive materials or combinations of these.

By non-fugitive is meant that the material is non-reactive, non-volatile, and remains essentially unchanged throughout the steps of the process and intact as part of the final product body and form a repeated structure therein, as opposed to burnout materials or carbonized. Some non-fugitive materials are cordierite powder, clays, glass powders, aluminosilicate, sand, and combinations of these. Preferred are non-fugitive materials because they contribute to the strength of the final body. Some preferred non-fugitive materials are cordierite, clays, glass powders, aluminosilicate and combinations of these. Especially preferred is alumino-silicate.

The above given fugitive materials aid in formation of the body and serve to support the body and maintain its shape before the curing step. They carbonize during the carbonization step. Some fugitive materials, especially cotton fibers are capable of holding a great amount of resin and hence give a high carbon yield in the body, although the strength of such bodies is not as high as bodies with non-fugitive supports.

Some supporting materials that are especially useful in this form are alumino-silicate, cordierite, cotton, and combinations of these.

The loose material can be preshaped. It is especially preferred that fibers be in the form of a mat for especially good facility in shaping and to provide a closely knit or strong support for the resin and subsequently the carbon. The mat is made preferably from short fibers but in some cases continuous fibers can be used to attain a given configuration in the final composite. Also, for forming mats it is preferred that the fibers be about 1 to 50 and more preferably about 2 to about 10 microns in diameter. The mats are of low bulk density (high void volume). The void volume can vary from about 50% to about 98%. Preferred void volumes are about 75% to about 95%.

It is preferred that the mat be capable of absorbing at least about three times their own weight, and more preferably at least about five times their own weight in resin when impregnated therewith.

Alumino-silicate fibers, cotton fibers and combinations of these are especially useful in the form of mats. One preferred mat is of alumino-silicate fibers, especially in the form of short fibers, such as Fiberfax 970 fiber mat supplied by Carborundum Co., Niagara Falls, N.Y.

The support material is contacted with the resin to impregnate or saturate the support material thoroughly therewith. The resin must be in form of a solution, liquid, or suspension. If the resin is in solid, eg., powder form, it is introduced into a suitable medium, such as liquid phenolic resin solution or water. Wetting agents can be used if necessary to enhance the wettability of the support material. One example of such a material is silane coupling agents used to increase the wettability and bonding. Silane coupling agents can be represented by the formula $YRSiX_3$, where X represents a hydrolyzable group typically alkoxy and Y a functional organic group such as amino metheneyloxy, epoxy, etc. The R component is typically a small aliphatic linkage. An example of silane coupling agent is Z-6020 silane from Dow Corning. It is designated N-(B-aminoethyl)-γ-aminopropyl trimethoxy-silane. Titanate coupling agents can also be used.

The impregnation can be done by techniques such as dipping or spraying into or spraying with the resin solution or suspension for a mat; or by mixing with support material (loose powder or fibers) in an appropriate mixer and then pouring the mixture into an appropriate mold.

In some cases the support material can be first impregnated with a catalyst which is known to accelerate the curing reaction, and then mixed with the resin. On pouring into the mold, the resin becomes rigid and curing is accomplished. An example of this process is the case of furan resin cured with catalysts such as $ZnCl_2$, PTSA (para-toluene sulfonic acid), citric acid, or some other catalyst.

The resin impregnated fibers are then dried to remove the liquid phases, eg., solvents, etc., therefrom. The drying advances the resin to a non-tacky but still flexible state, commonly called the "B stage". At this stage, partial crosslinking in the resin takes place. The drying conditions of temperature and time are chosen depending on the combination and amounts of resin and support material although typical drying temperatures are in the range of about 80° C.–110° C. The drying conditions can be, adjusted as necessary to achieve the "B" stage.

For example, in the case of phenolic resole resin, water, the solvent is removed by drying at about 80° C.–85° C., and then at about 100° C.–110° C. for a total time of up to about 3 hours. For example for a 2–3 mm thick sheet or mat of alumino-silicate fibers impregnated with resin, the drying time is about 1.5–2 hours at about 80° C.–85° C. and then about 20–30 minutes at about 100° C.–110° C. to obtain the flexible non-tacky state.

In accordance with a preferred embodiment, phenolic resole resin is contacted with support material which is in the form of a mat. The mat is preferably either alumino-silicate fibers or cotton fibers, and most preferably alumino-silicate fibers.

The resin-impregnated support material is then shaped into the desired shape.

This can be done by known simple operations such as cold stamping, rolling or other simple procedures. One advantage of the flexible mats is that they are easily handled and can be formed into various shapes by several suitable techniques. This allows great adaptability in applications in which available space is limited such as in automotive and face mask applications. One shape that is suitable for automotive applications, for example, is a honeycomb.

In accordance with a preferred embodiment, the fibers are in the form of a mat which is impregnated with resin by dipping into the resin and then removing the excess resin. Especially suited mats are short fiber aluminosilicate mats and low density cotton fiber mats. Especially suited resin for use with these mats is phenolic resole resin.

Some especially suitable techniques for shaping resin impregnated mats will now be described.

The impregnated mats can be stamped into various forms. For example alternated grooves can be created on the mat such as by pressing a wooden cylindrical rod in the soft mat. This grooved mat can be used as is or further shaped into a honeycomb body. This is done by placing strands of the grooved mat on another piece of flat mat and rolling into a cylindrical body.

The mats can be made into honeycomb bodies by first shaping the mats into a sine wave pattern and then alternately stacking flat and sine wave mats. The mats can be corrugated by pressing the mat between a flat surface and wooden sticks. The corrugated mat is then rolled into a cylindrical body.

The resin is then cured in the shaped form by heating under the specific temperature and time conditions required for the specific resin. This can be found in the manufacturer's literature. For example, for phenolic resole 43290 from Occidental Chemical Co. the body is heated to about 140°–155° C. The final temperature is attained slowly so that the body does not distort. For example, the body is first heated to about 90° C.–100° C., then to about 120° C.–130° C. and held at this temperature for about 1–2 hours. It is then heated to about 140° C.–155° C. and held for about 30 minutes–2 hours for final cure. The curing is done typically in air, although it can also be done in a nitrogen atmosphere.

The shape taken by the resin during the previously described shaping which is done at low temperatures, is not distorted during the curing.

The resulting cured resin shaped body is then carbonized and activated to convert the resin to activated carbon.

The carbonization is carried out by heating the body in an inert or reducing atmosphere such as nitrogen or argon, more typically nitrogen, at about 600° C.–1000° C., more typically at about 700° C.–1000° C. for a length of time of usually about 1–20 hours. During carbonization low molecular weight compounds separate out and carbon atoms form graphitic structures. For example for phenolic resole resin 43290 from Occidental Chemical Co. and Furan Furcarb resin from QO Chemicals, carbonization is done by heating at a rate of about 150° C./hr in $N_2$. The temperature is held at about 900° C. for about 6–10 hours to complete the carbonization. The temperature is then reduced to 25° C. at a cooling rate of about 150° C./hr. On carbonization, the body contains random three dimensional oriented graphitic platelets with amorphous carbon between the platelets. If desired, carbonized mats can be broken into granules at this point.

The carbon in the body is then activated by partially oxidizing in a suitable oxidant such as $CO_2$, steam, air, or a combination of these, etc. Activation can be carried out at temperatures between about 700° C.–1000° C. Activation conditions depend on type and amount of resin, flow rate of gas, etc. For example for phenolic resole and Furcab resins activation conditions are at about 900° C. for about 1 hour in $CO_2$ at a flow rate of about 14.2 l/hr. (about 0.5 CFH (cubic feet per hour)). The partial oxidation during activation causes the removal of the amorphous carbon and the formation of molecular size porosity between the graphitic platelets. This porosity and the graphitic platelets impart the adsorption characteristics to the resulting activated carbon body.

Mats can be broken up in granules of various sizes suitable to the application. Breaking up of the mats is done at any point in the process after curing. For example, it can be done either after curing and before carbonizing, or after carbonizing and before activating, or after activating. The granules are then subjected to the remainder of steps thru activation to form the final activated carbon composite. Granules made according to the present invention have at least about twice the butane adsorption capacity as commercial activated carbon granules as will be seen in the examples that follow.

To more fully illustrate the invention, the following non-limiting examples are presented. All parts, portions, and percentages are on a weight basis unless otherwise stated.

Two commercial containers of granulated activated carbon were measured for packing density and butane adsorption capacity. The results are given in Table 1 and serve as a basis of comparison with the inventive examples given below. The adsorption capacity was measured by packing the carbons in a 2.54 cm (1") high ×2.54 cm (1") diameter cylindrical bed and passing 4000 cc/minute of nitrogen mixed with 1500 ppm of butane. Both absolute adsorption capacity (mg/g of carbon), and total adsorption capacity for the bed were measured.

TABLE 1

|  | Packing Density g/cc | Adsorbtion Capacity mg/g | Total Adsorbtion Capacity mg |
| --- | --- | --- | --- |
| No. 1 | 0.37 | 51.2 | 243 |
| No. 2 | 0.40 | 70.0 | 358 |

EXAMPLE 1 (inventive)

An alumino-silicate short fiber in the form of a low density fiber mat (Fiberfax 970 fiber mat from Carborundum Co., Niagara Falls, N.Y.) was impregnated with a phenolic resole resin (43290 resin from Occidental Chemical Corp., Niagara Falls, N.Y.) by dipping the mat in the resin. After removal of excess resin the mat was dried at about 80° C. for about 2 hours and about 100° C. for about 30 minutes. This drying procedure resulted in removal of water and advancing the resin via the curing reaction to a tack-free flexible state. The ratio of the weight of the resin solution to the weight of the mat was about 13:1 before drying. The flexible mat was easily formed into various shapes. Alternate grooves were created on the mat by pressing a wooden cylindrical rod in the soft mat. The flexible mat was then heated slowly to about 100° C., held at temperature for about 1 hour and then heated to about 125° C. and held for about 1 hr. before being finally heated to about 150° C. for about 30 minutes to complete cure. The procedure resulted in a mat with all the sharp surface features intact with no sign of flow. The weight ratio of resin to the fiber after cure was about 8:1.

EXAMPLE 2 (comparative)

The experiment of example 1 was repeated with a polyester fiber mat. In spite of equivalent void fractions to that of the mat of example 1, all the resin picked up by the mat dropped out of it, leaving essentially dry polyester mat. The inability of the mat to hold on to the impregnated resin is due to its hydrophobic character and the aqueous resin solution. The fiber mat thus should be made from fibers that are wetted by the resin.

EXAMPLE 3 (inventive)

The experiment of example 1 was repeated with a low density cotton fiber mat. The fibers were wetted well by the resin. The wet resin to fiber mat weight ratio was about 30:1. The resin was dried at about 80° C. for about 2 hours and at about 100° C. for about 30 minutes to obtain a flexible mat which was easily stamped into various forms. The flexible mat was heated at about 100° C. for about 1 hour and cured at about 125° C. for about 1 hour, and about 150° C. for about 1 hr. The ratio of the weights of cured resin to that of the fiber mat was about 14:1. The resin pick up by the fiber mat was thus almost twice as much as the alumino-silicate fiber mat.

EXAMPLE 4a (inventive)

The flexible mat of example 1 was shaped into a sine-wave type of body. A honeycomb shape was generated by alternately stacking flat and sine-wave pieces and cured to obtain a strong honeycomb shape. This shape was then carbonized by being heated to about 900° C. at a heating rate of about 150° C./hr in nitrogen (about 6 hours) in nitrogen. The carbonized preform then was activated by carbon dioxide at about 900° C. for about 1 hour.

EXAMPLE 4b (comparative)

A replica of the sample in example 4a was made using corrugated cardboard as a substrate. The cardboard was dipped in resin and a honeycomb was fabricated by alternately stacking layers to produce a honeycomb body. The cardboard body (or paper body) was carbonized and activated in the same way as the fiber mat body. The butane adsorption capacity was measured on the honeycomb bodies of about 2.54 cm (1") height and about 2.54 cm (1") diameter by the test described earlier. The butane adsorption capacity of the cardboard paper honeycomb body was about 180 mg and that of the fiber mat body was about 560 mg. The example clearly shows that resin impregnated bodies made from the paper have very low adsorption capacities due to low resin pick-up. The inventive body has three times higher adsorption capacity than that of the paper body. The adsorption capacity of the inventive body is twice that of commercial automotive canister granulated bed No. 1 and about 60% higher than commercial automotive canister granulated bed No. 2.

EXAMPLE 5 (inventive)

The flexible fiber mat of example 1 was corrugated by processing between a flat surface and wooden sticks. The corrugated mat was rolled into a cylinder, cured, carbonized and activated as in Example 4a. This cylindrical shape had a butane adsorption capacity of about 650 mg. This inventive body thus has adsorption capacity about 2.67 times commercial bed No. 1 and about 1.8 times bed No. 2.

EXAMPLE 6 (inventive)

The flexible fiber mat of example 1 was cut into about 1 mm×1 mm cross section strands. The strands were placed on another piece of the mat at about 5 mm intervals and the mat was rolled into a cylindrical body. This body was cured, carbonized and activated 4a. A 2.54 cm (1") diameter by 2.54 cm (1") long cylinder core drilled out of this body had a butane adsorption capacity of about 750 mg. The measured capacity is more than twice that of bed No. 2 which was about 358 mg.

EXAMPLE 7 (inventive)

The mat of example 1 was carbonized at about 900° C. and activated in $CO_2$ for about 2 hr. The mat was then crushed into granules measuring about 1–2 millimeter in diameter. The adsorption capacity of the granules was measured by the same method used on the previously described commercial granules. It was found that the butane adsorption capacity was about 160 mg/g of activated carbon in the granules. This adsorption capacity is significantly higher than the adsorption capacity obtained with commercial carbons given in Table 1.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making an activated carbon composite, said method comprising:

a) impregnating a support material with a crosslinkable resin to saturate the support material with the resin and form a supported resin, wherein the viscosity of the resin is about 50 cps to 1000 cps, said support material being selected from the group consisting of cotton, chopped wood, sisal, non-fugitive material, and combinations thereof;

b) drying the supported resin;

c) shaping the dried supported resin;

d) curing the resin;

e) carbonizing the cured resin by heating the cured resin at a temperature of about 600° C. to 1000° C. in an inert or reducing atmosphere; and f) heat-treating the supported resin from step e to activate the carbon and produce an activated carbon composite adsorber.

2. A method of claim 1 wherein the support material is in the form of fibers.

3. A method of claim 2 wherein the fibers are selected from the group consisting of alumino-silicate, cordierite, cotton, and combinations thereof.

4. A method of claim 2 wherein the fibers are in the form of a mat.

5. A method of claim 4 wherein the mat is made of material selected from the group consisting of alumino-silicate, cotton, and combinations thereof.

6. A method of claim 4 wherein the void volume of the mat is about 50% to about 98%.

7. A method of claim 4 wherein after curing, the mat-supported resin is broken up into granules.

8. A method of claim 1 wherein the resin is a thermosetting resin.

9. A method of claim 8 wherein the resin is selected from the group consisting of phenolic resins, furan, and combinations thereof.

10. A method of claim 9 wherein the resin is phenolic resole.

11. A method of claim 1 wherein the support material is non-fugitive.

12. A method of claim 11 wherein the non-fugitive support material is selected from the group consisting of cordierite, clays, glass powders, alumino-silicate, and combinations thereof.

13. A method of claim 1 wherein the dried resin and support are shaped into a honeycomb.

14. A method of claim 1 wherein the resin is phenolic resole, and the support is in the form of a mat.

15. A method of claim 14 wherein the mat is made of alumino-silicate fibers.

16. A method of claim 15 wherein the dried resin and alumino-silicate mat are shaped into a honeycomb.

17. A method of claim 1 wherein the support is a fibrous mat that is impregnated with an amount of resin equal to at least three times the weight of said fibrous mat.

18. A method of claim 1 wherein the support is a fibrous mat that is impregnated with an amount of resin equal to at least five times the weight of said fibrous mat.

* * * * *